June 30, 1936. G. REBHAHN 2,046,089
RODENT POISON SPREADER
Filed Jan. 23, 1935
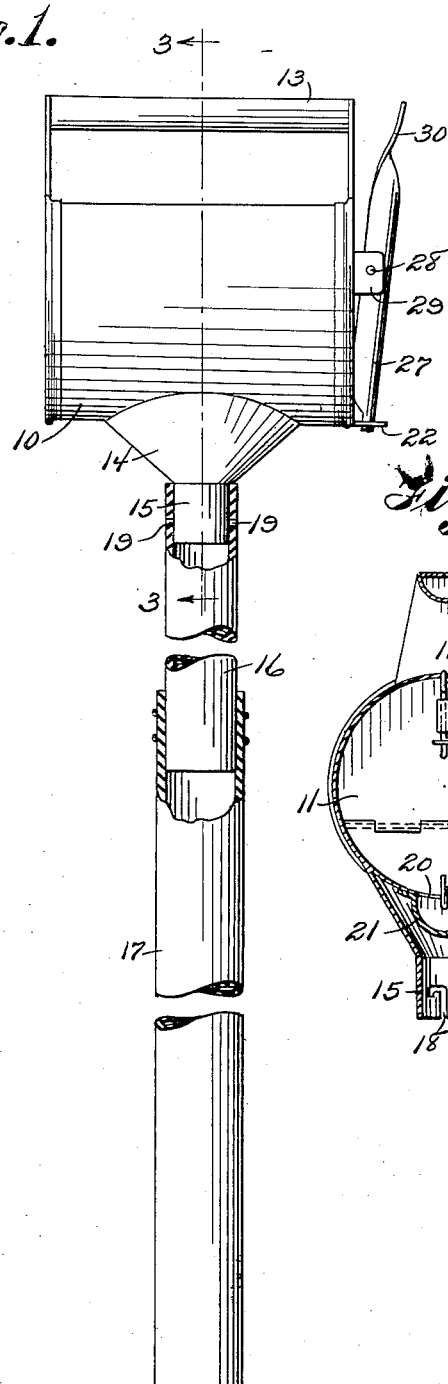
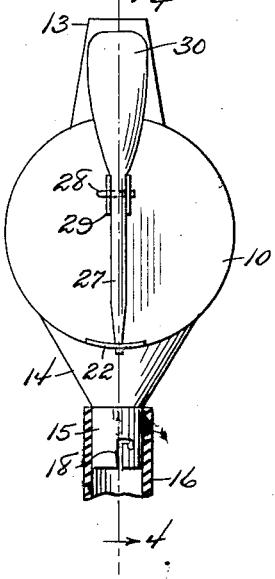
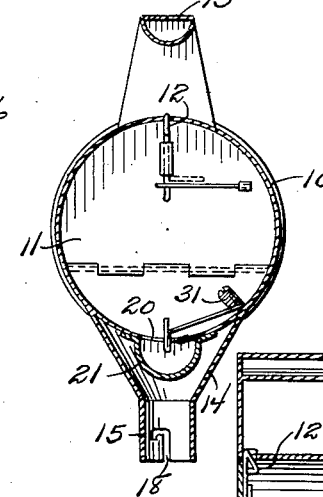
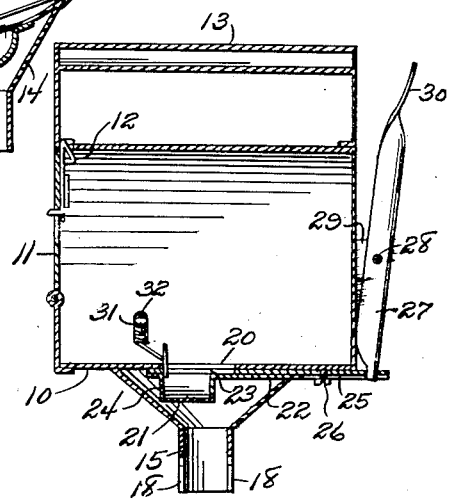
George Rebhahn INVENTOR
BY Victor J. Evans & Co.
ATTORNEY Patented June 30, 1936

2,046,089

UNITED STATES PATENT OFFICE 2,046,089

RODENT POISON SPREADER

George Rebhahn, Barber, Mont.

Application January 23, 1935, Serial No. 3,145

1 Claim. (Cl. 221—104)

The invention relates to a poison dispensing device and more especially to a rodent poison spreader.

The primary object of the invention is the provision of a device of this character, wherein the poisonous food, as for example, oats, meal, corn or other feed treated with poisonous matter, can be conveniently and easily dispensed, particularly at the point of location of the hole of a rodent, as for example, gophers, for the killing and exterminating of such pests.

Another object of the invention is the provision of a device of this character, wherein the substance to be dispensed can be delivered in a convenient manner in determined quantities, and particularly if the user is riding a horse, so as to direct the poisonous food at the desired place, the said device being capable of convenient carriage in the hand of a person and operable with dispatch and ease, without waste of the substance in the dispensing of the same.

A further object of the invention is the provision of a device of this character, which is simple in construction, thoroughly reliable and efficient for the purpose intended thereof, capable of use when walking or riding horseback, readily and easily operated, light in weight to render the same readily portable, yet strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a side elevation of a device constructed in accordance with the invention, the same being partly in section.

Figure 2 is a fragmentary end elevation partly in section.

Figure 3 is a sectional view on the line 3—3 of Figure 1 looking in the direction of the arrows.

Figure 4 is a sectional view on the line 4—4 of Figure 2 looking in the direction of the arrows.

Similar reference characters indicate corresponding parts throughout the several view in the drawing.

Referring to the drawing in detail, the device comprises a cylindrical body 10 forming a container for food substance treated with poison, as for example, oats, meal, corn or other feed for animal consumption. This body 10 is closed at opposite ends except that a hinged gate 11 is provided at one of these ends so that upon the opening of the gate, substance can be introduced into the body for the filling thereof. The gate carries a hand releasable spring latch 12 which releasably fastens such gate in closed position.

At the upper portion of the body 10 there is provided a handle 13, it being substantially the length of the body and by reason of its location at the uppermost portion thereof the device can be readily carried without undue strain on the wrist of the hand of the person carrying the same. At the diametrically opposite portion of the body with respect to the handle is a delivery funnel 14, it having a neck 15 serving as a nipple for the detachable coupling therewith of a tubular nozzle 16 to which is adapted to be applied a flexible discharge hose piece 17 which is of the required length for directing the substance discharged from the body and this hose piece is serviceable when the user of the device is riding horseback. The hose piece delivers the substance as contained within the body 10 for the deposit of such poisonous substance at the localities required, particularly next to a hole for rodents, as for example, gophers.

The neck 15 of the funnel 14 is provided with the bayonet slots 18 for fastening lugs or pins 19 carried by the nozzle 16 and in this manner the said nozzle is separably attached to the neck 15 of the funnel 14 so that the device can be used at close range and in this the necessity for the hose piece is avoided, it being understood, of course, that the hose piece 17 can be of the required length to permit the directing of the substance to be dispensed to a particular point for deposit thereof when at long range.

Formed in the body 10 for communication of the funnel 14 is an opening 20 which confronts a measuring hopper 21 fixed to and depending from said body into the funnel 14. This hopper 21 measures a determined quantity of substance when deposited therein for the discharge of the determined quantity from the body 10, while working through the said hopper 21, which is open at opposite ends, is an ejector including the slide 22 having the opening 23 corresponding in size to the opening 20 and normally registering therewith. Depending from the slide 22 are the end closure extensions 24 for the hopper 21 so as to retain a determined quantity of substance admitted into the hopper and to deliver such quantity therefrom into the funnel 14 for the dispensing of this quantity through the nozzle for its deposit onto the ground, preferably at the hole of the rodent. On eating of this substance, which is of poisonous nature, the rodent will die from the effects thereof and in this manner such pests may be exterminated.

The slide 22 is slotted, at 25, for a guide screw 26 and this slide is operated by a trigger 27 pivoted, at 28, to a bracket 29 carried at the end of the body 10 opposite the gate 11, the trigger 27 being formed with the finger piece 30 in convenient reach with relation to the handle 13 so that the finger of the hand of an operator grasping the handle can readily and conveniently manipulate the trigger for the operation of said device in the dispensing of determined quantities of substance, as hereinbefore stated.

The slide 22 is held in normal position under the tension of a coiled spring 31 acting thereon and mounted, at 32, within the body 10 of the device. This spring normally holds the slide 22 in a position so that the extensions 24 will close the opposite open ends of the hopper 21 and the latter will receive the determined quantity of substance from the body 10 of the device. When the trigger 27 is operated, the slide 22 will be shifted against the resistance of the spring 31 and the extensions 24 depending therefrom will eject the measured quantity of substance from the hopper 21 into the funnel 14 and thence by gravity this measured quantity of substance will be delivered or dispensed through the nozzle and hose piece for deposit.

What is claimed is:

A device of the character described comprising a cylindrical reservoir, a discharge funnel at one side of the reservoir, a hose length detachably joined with said funnel, a measuring hopper within the funnel and depending from the reservoir and having discharge openings at opposite ends for delivering material from the reservoir to said hopper in determined quantities, a slide operating within the hopper for ejecting material therefrom into the funnel, and means at one end of the reservoir for actuating said slide, the said slide and hopper being disposed crosswise of the funnel while the slide operates longitudinally of said reservoir.

GEORGE REBHAHN.